United States Patent
Tang et al.

(10) Patent No.: US 12,445,812 B2
(45) Date of Patent: Oct. 14, 2025

(54) METHODS FOR REPORTING USAGE, AND NETWORK FUNCTION AND STORAGE MEDIUM

(71) Applicant: ZTE Corporation, Shenzhen (CN)

(72) Inventors: Weijie Tang, Shenzhen (CN); Changyi Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 404 days.

(21) Appl. No.: 18/011,140

(22) PCT Filed: May 26, 2021

(86) PCT No.: PCT/CN2021/095924
§ 371 (c)(1),
(2) Date: Dec. 16, 2022

(87) PCT Pub. No.: WO2021/254112
PCT Pub. Date: Dec. 23, 2021

(65) Prior Publication Data
US 2023/0179968 A1   Jun. 8, 2023

(30) Foreign Application Priority Data

Jun. 19, 2020   (CN) .......................... 202010567911.8

(51) Int. Cl.
*H04W 4/24* (2024.01)
*H04W 24/10* (2009.01)

(52) U.S. Cl.
CPC ............. *H04W 4/24* (2013.01); *H04W 24/10* (2013.01)

(58) Field of Classification Search
None
See application file for complete search history.

(56) References Cited

U.S. PATENT DOCUMENTS

| | | |
|---|---|---|
| 10,531,515 B1 | 1/2020 | Engelhart |
| 2019/0306758 A1 | 10/2019 | Ma et al. |

(Continued)

FOREIGN PATENT DOCUMENTS

| | | |
|---|---|---|
| CN | 110166961 A | 8/2019 |
| CN | 110324866 A | 10/2019 |

(Continued)

OTHER PUBLICATIONS

Extended European Search Report for European Application No. 21826726.8 dated Oct. 19, 2023.

(Continued)

*Primary Examiner* — Adolf Dsouza
(74) *Attorney, Agent, or Firm* — Wolf, Greenfield & Sacks, P.C.

(57) ABSTRACT

Provided are a method for reporting usage, an Intermediate-Session Management Function (I-SMF) entity, a CHarging Function (CHF) entity, a Session Management Function (SMF) entity, and a non-transitory computer-readable storage medium. The method for reporting usage may include: acquiring address information of a CHarging Function (CHF) entity and a session charging identifier; receiving usage information reported by a managed User Plane Function (UPF) entity; and reporting the usage information and the session charging identifier to the CHF entity according to the address information of the CHF entity, so that the CHF entity counts the usage information in a fee of a corresponding user according to the session charging identifier.

19 Claims, 8 Drawing Sheets

(56) References Cited

U.S. PATENT DOCUMENTS

| | | | | |
|---|---|---|---|---|
| 2020/0145538 | A1* | 5/2020 | Qiao | H04M 15/85 |
| 2020/0177439 | A1 | 6/2020 | Afzal et al. | |
| 2022/0014944 | A1 | 1/2022 | Liang et al. | |
| 2022/0200813 | A1* | 6/2022 | Thiebaut | H04L 12/1407 |
| 2022/0345532 | A1* | 10/2022 | Chandramouli | H04L 67/146 |
| 2023/0142675 | A1* | 5/2023 | Cui | H04W 48/10 370/328 |

FOREIGN PATENT DOCUMENTS

| | | |
|---|---|---|
| CN | 110730487 A | 1/2020 |
| EP | 3755014 A1 | 12/2020 |
| JP | 2022-502926 A | 1/2022 |
| WO | WO 2019/197426 A1 | 10/2019 |
| WO | WO 2020/063412 A1 | 4/2020 |

OTHER PUBLICATIONS

International Preliminary Report on Patentability for International Application No. PCT/CN2021/095924 mailed Dec. 29, 2022.
[No Author Listed], Removal of Editor's note in Sol#13 and Sol#15. NTT DOCOMO, NEC, Nokia, Nokia Shanghai Bell. SA WG2 Meeting #127-Bis. S2-185425. May 28-Jun. 1, 2018. 6 pages.
First Office Action for Chinese Application No. 202010567911.8, dated Dec. 16, 2024.
Office Action for Japanese Application No. 2022-577736, mailed Jan. 9, 2024.
Search Report for Japanese Application No. 2022-577736, dated Nov. 17, 2023.
[No Author Listed] 3GPP TSG-CT WG4 Meeting #96, C4-201070: Home Provided Charging ID and Roaming Charging Profile. Feb. 24-28, 2020:1-29.
[No Author Listed] 3GPP TSG-SA Meeting #87E, SP-200170: Rel-16 CRs on Charging aspects of ETSUN. Mar. 17-20, 2020:1-2.
[No Author Listed] 3GPP TSG-SA5 Meeting #129e, S5-201154: Update of Serving Network Function ID. Feb. 24-Mar 4, 2020:1-2.
[No Author Listed] 3GPP TSG-SA5 Meeting #129-e, S5-201452: Remove Editor's note of PDU Session establishment with I-SMF insertion. Feb. 24-Mar 4, 2020:1-5.
[No Author Listed] 3GPP TSG-SA5 Meeting #129-e, S5-201453: 5GS to EPS handover using N26 interface with I-SMF. Feb. 24-Mar 4, 2020:1-2.
[No Author Listed] 3GPP TSG-SA5 Meeting #129-e, S5-201455: EPS to 5GS handover using N26 interface with I-SMF. Feb. 24-Mar 4, 2020:1-2.
[No Author Listed] 3GPP TSG-SA5 Meeting #129e, S5-201459: Introduction of V-SMF change in Roaming HR—principles. Feb. 24-Mar 4, 2020:1-4.
[No Author Listed] 3GPP TSG-SA5 Meeting #129e, S5-201460: Introduction of V-SMF change in Roaming HR—flows. Feb. 24-Mar 4, 2020:1-5.
[No Author Listed] 3GPP TSG-SA5 Meeting #129e, S5-201573: Add the branching point or UL CL controlled by I-SMF. Feb. 24-Mar 4, 2020:1-10.
[No Author Listed] 3GPP TSG-SA5 Meeting #129-e, S5-201574: Addition/removal/change of PSA2 and UL CL or BP controlled by I-SMF. Feb. 24-Mar 4, 2020:1-3.
[No Author Listed] SA WG2 Meeting #127Bis, S2-185574 (revision of S2-184835): Alternative PDU session context retrieval with I-SMF change during handover. May 28-Jun. 1, 2018:1-6.
[No Author Listed] SA WG2 Meeting #128-Bis, S2-187905: Conclusion proposal on AF influence. Aug. 20-24, 2018:1-2.
[No Author Listed] SA WG2 Meeting #129, S2-1810049: Conclusion proposal on AF influence. Oct. 15-19, 2018:1-5.
EP 21826726.8, Oct. 19, 2023, Extended European Search Report.
PCT/CN2021/095924, Dec. 29, 2022, International Preliminary Report on Patentability.
International Search Report and Written Opinion for International Application No. PCT/CN2021/095924 mailed Jul. 26, 2021.
[No Author Listed], Evaluation of solutions to KI#5. Ericsson. SA WG2 Meeting #128bis. S2-189005. Aug. 2018. 8 pages.
[No Author Listed], ETSUN architecture solution analysis and proposed way forward. Ericsson. SA WG2 Meeting #129. S2-1810936. Oct. 2018. 7 pages.

* cited by examiner

METHODS FOR REPORTING USAGE, AND NETWORK FUNCTION AND STORAGE MEDIUM

CROSS-REFERENCE TO RELATED APPLICATION

This application is a national stage filing under 35 U.S.C. § 371 of international application number PCT/CN2021/095924, filed May 26, 2021, which claims priority to Chinese patent application No. 202010567911.8, filed Jun. 19, 2020. The contents of these applications are incorporated herein by reference in their entirety.

TECHNICAL FIELD

The present disclosure relates to the field of mobile communications technologies, and in particular, to a method for reporting usage, an Intermediate-Session Management Function (I-SMF) entity, a CHarging Function (CHF) entity, a Session Management Function (SMF) entity, and a non-transitory computer-readable storage medium.

BACKGROUND

In a 5th Generation (5G) communications system with an I-SMF, when the I-SMF manages a User Plane Function (UPF) entity having an Uplink Classifier (UL/CL) and a branching point, the I-SMF needs to request corresponding N4 information and charging information from an SMF entity first. Then the SMF generates N4 information and charging information and transmits them to the I-SMF, and the I-SMF initiates a corresponding operation request of the UPF. When the UPF managed by the I-SMF reports usage regularly or in an offline state, the UPF reports to the SMF via the I-SMF, and finally to a CHF entity via the SMF.

However, when the I-SMF and the SMF suffer a link failure, a message transmission failure or other abnormal cases during interaction, the I-SMF cannot report the usage of the managed UPF to the SMF, which causes a loss of usage record and further causes a loss to an operator.

SUMMARY

In view of this, embodiments of the present disclosure provide a method for reporting usage, an I-SMF entity, a CHF entity, an SMF entity, and a non-transitory computer-readable storage medium.

In accordance with a first aspect, an embodiment of the present disclosure provides a method for reporting usage, applied to an I-SMF entity, the method including: acquiring address information of a CHF entity and a session charging identifier; receiving usage information reported by a managed UPF entity; and reporting the usage information and the session charging identifier to the CHF entity according to the address information of the CHF entity, so that the CHF entity counts the usage information in a fee of a corresponding user according to the session charging identifier.

In accordance with a second aspect, an embodiment of the present disclosure provides a method for reporting usage, applied to a CHF entity, the method including: receiving usage information and a session charging identifier reported by an I-SMF entity; and counting the usage information in a fee of a corresponding user according to the session charging identifier.

In accordance with a third aspect, an embodiment of the present disclosure provides a method for reporting usage, applied to an SMF entity, the method including: sending address information of a CHF entity and a session charging identifier to an I-SMF entity.

In accordance with a fourth aspect, an embodiment of the present disclosure provides an I-SMF entity including a communication circuit, a memory, and a processor, where the communication circuit is configured for communication; the memory is configured to store a computer program; and the processor is configured to execute the computer program and, when executing the computer program, implement the method for reporting usage of the first aspect.

In accordance with a fifth aspect, an embodiment of the present disclosure provides a CHF entity including a communication circuit, a memory, and a processor, where the communication circuit is configured for communication; the memory is configured to store a computer program; and the processor is configured to execute the computer program and, when executing the computer program, implement the method for reporting usage of the second aspect.

In accordance with a sixth aspect, an embodiment of the present disclosure provides an SMF entity including a communication circuit, a memory, and a processor, where the communication circuit is configured for communication; the memory is configured to store a computer program; and the processor is configured to execute the computer program and, when executing the computer program, implement the method for reporting usage of the third aspect.

In accordance with a seventh aspect, an embodiment of the present disclosure provides a non-transitory computer-readable storage medium storing a computer program which, when executed by a processor, causes the processor to implement the method for reporting usage of the first aspect.

In accordance with an eighth aspect, an embodiment of the present disclosure provides a non-transitory computer-readable storage medium storing a computer program which, when executed by a processor, causes the processor to implement the method for reporting usage of the second aspect.

In accordance with a ninth aspect, an embodiment of the present disclosure provides a non-transitory computer-readable storage medium storing a computer program which, when executed by a processor, causes the processor to implement the method for reporting usage of the third aspect.

DETAILED DESCRIPTION

Figure 1:
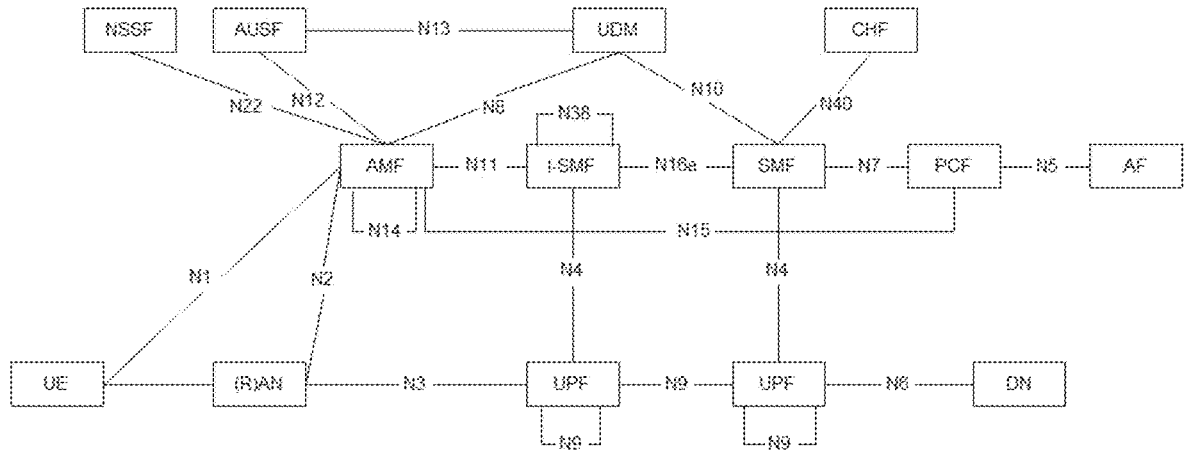
FIG. 1 is a schematic diagram of an overall architecture of 5G with I-SMF.

The technical schemes in the embodiments of the present disclosure are clearly and completely described in the following with reference to the drawings in the embodiments of the present disclosure. It is obvious that the described embodiments are only some of the embodiments of the present disclosure and are not all the embodiments. All other embodiments obtained by those of ordinary skill in the art based on the embodiments of the present disclosure without inventive effort are within the scope of the present disclosure.

The flowchart shown in the drawings is only an exemplary illustration, and does not necessarily include all contents and operations/steps, nor do the operations/steps have to be executed in the described order. For example, some operations/steps can be decomposed, combined, or partially combined, so the actual execution order may change according to the actual situation.

In the following description, suffixes such as "module", "component" and "unit" used to represent elements are only to facilitate the description of the present disclosure, and have no special meanings in themselves. Therefore, "module", "component" or "unit" can be used in a mixed way.

An overall architecture of 5G with I-SMF will be introduced first before the detailed introduction of the embodiments of the present disclosure.

Referring to FIG. 1, a schematic diagram of an overall architecture of 5G with I-SMF is depicted. The 5G architecture includes: an Access Management Function (AMF) entity, an I-SMF, an SMF, a UPF, a Unified Data Management (UDM) entity, a Policy Control Function (PCF) entity, a Network Repository Function (NRF) entity, a CHF entity, an Authentication Server Function (AUSF) entity, a Network Slice Selection Function (NSSF) entity, and an Application Function (AF) entity.

Here, a user-plane connection is User Equipment (UE)-Radio Access Network (RAN)-UPF managed by the I-SMF-UPF managed by the SMF, where the UPFs are connected to Data Network (DN); and a control-plane connection is UE-RAN-AMF-I-SMF-SMF, where the I-SMF and the SMF are selected by the AMF, the control plane and the user plane are separate architectures, and the UPF is selected and managed by the SMF.

When the I-SMF manages a UPF with an UL/CL and a branching point, the I-SMF needs to request corresponding N4 information and charging information from the SMF first. Then the SMF generates N4 information and charging information and transmits them to the I-SMF, and the I-SMF initiates a corresponding operation request of the UPF. When the UPF managed by the I-SMF reports usage regularly or in an offline state, the UPF reports to the SMF via the I-SMF, and finally to the CHF via the SMF.

However, when the I-SMF and the SMF suffer a link failure, a message transmission failure or other abnormal cases during interaction, the I-SMF cannot report usage of the managed UPF to the SMF, which causes a loss of usage record and further causes a loss to an operator.

The method on the I-SMF side of an embodiment of the present disclosure includes: acquiring address information of a CHF entity and a session charging identifier; receiving usage information reported by a managed UPF entity; and reporting the usage information and the session charging identifier to the CHF entity according to the address information of the CHF entity, so that the CHF entity counts the usage information in a fee of a corresponding user according to the session charging identifier. The I-SMF reports the usage information and the session charging identifier to the CHF according to the acquired address information of the CHF. In this way, the I-SMF can report the usage of the managed UPF to the CHF without forwarding of an SMF, which provides technical support for the CHF to count the usage of the UPF, and therefore provides technical support for avoiding a loss of usage and further avoiding a loss to an operator. A method on the CHF side includes: receiving usage information and a session charging identifier reported by an I-SMF entity; and counting the usage information in a fee of a corresponding user according to the session charging identifier. The CHF counts the usage information in the fee of the corresponding user according to the received session charging identifier. In this way, technical support can be provided for the CHF to count the usage of a UPF, thereby providing technical support for avoiding a loss of usage record and avoiding a loss to an operator. A method on the SMF side includes: sending address information of a CHF entity and a session charging identifier to an I-SMF entity. In this way, the I-SMF can conveniently obtain the address information of the CHF and the session charging identifier according to the current 5G system, providing technical support for the I-SMF to report the usage to the CHF.

The method for reporting usage in this embodiment of the present disclosure includes the method applied to the I-SMF (referred to as I-SMF side method), the method applied to the CHF (referred to as CHF side method), and the method applied to the SMF (referred to as SMF side method). For convenience of description and also for a better understanding of the communication method of the embodiments of the present disclosure, the I-SMF side method, the CHF side method, and the SMF side method are described in detail below in combination.

It should be noted that, although the I-SMF side method, the CHF side method and the SMF side method are described in combination, the I-SMF side method, the CHF side method and the SMF side method are independent of each other. In the I-SMF side method, the I-SMF is enabled to report the usage of the managed UPF to the CHF without forwarding of the SMF, which provides technical support for the CHF to count the usage of the UPF, and therefore provides technical support for avoiding a loss of usage record and avoiding a loss to an operator. In the CHF side method, technical support is provided for the CHF to count the usage of UPF, thereby providing technical support for avoiding a loss of usage record and avoiding a loss to the operator. In the SMF side method, the I-SMF can conveniently obtain the address information of the CHF and the session charging identifier according to the current 5G system, which provides technical support for the I-SMF to report the usage to the CHF. When the I-SMF side method and the CHF side method are combined together, usage of a UPF managed by the I-SMF can be reported to the CHF without forwarding of the SMF, so that the CHF can count the usage of the UPF, thereby avoiding a loss of usage record and a loss to the operator, ensuring timeliness and accuracy of usage reporting, and ensuring reliability of accounting of the operator.

Figure 2:
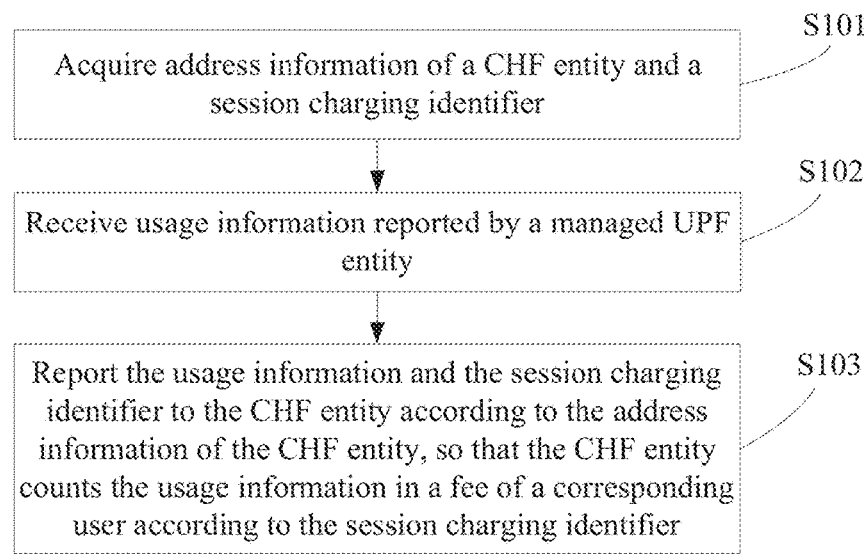
FIG. 2 is a flowchart of an embodiment of a method for reporting usage of the present disclosure.
Figure 3:
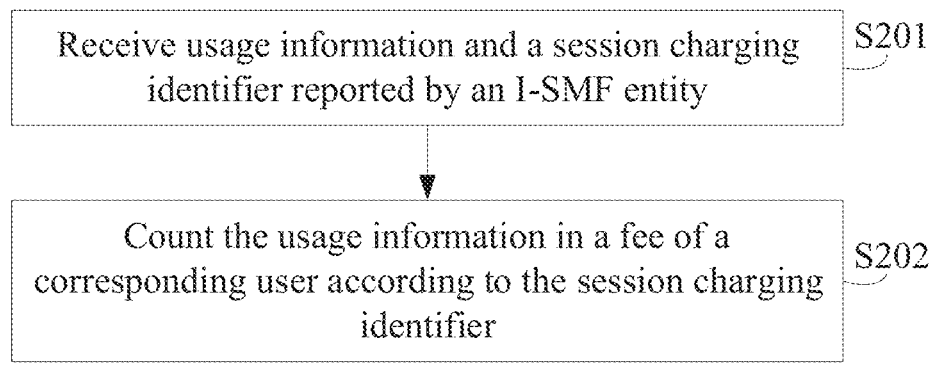
FIG. 3 is a flowchart of another embodiment of a method for reporting usage of the present disclosure.
Figure 4:
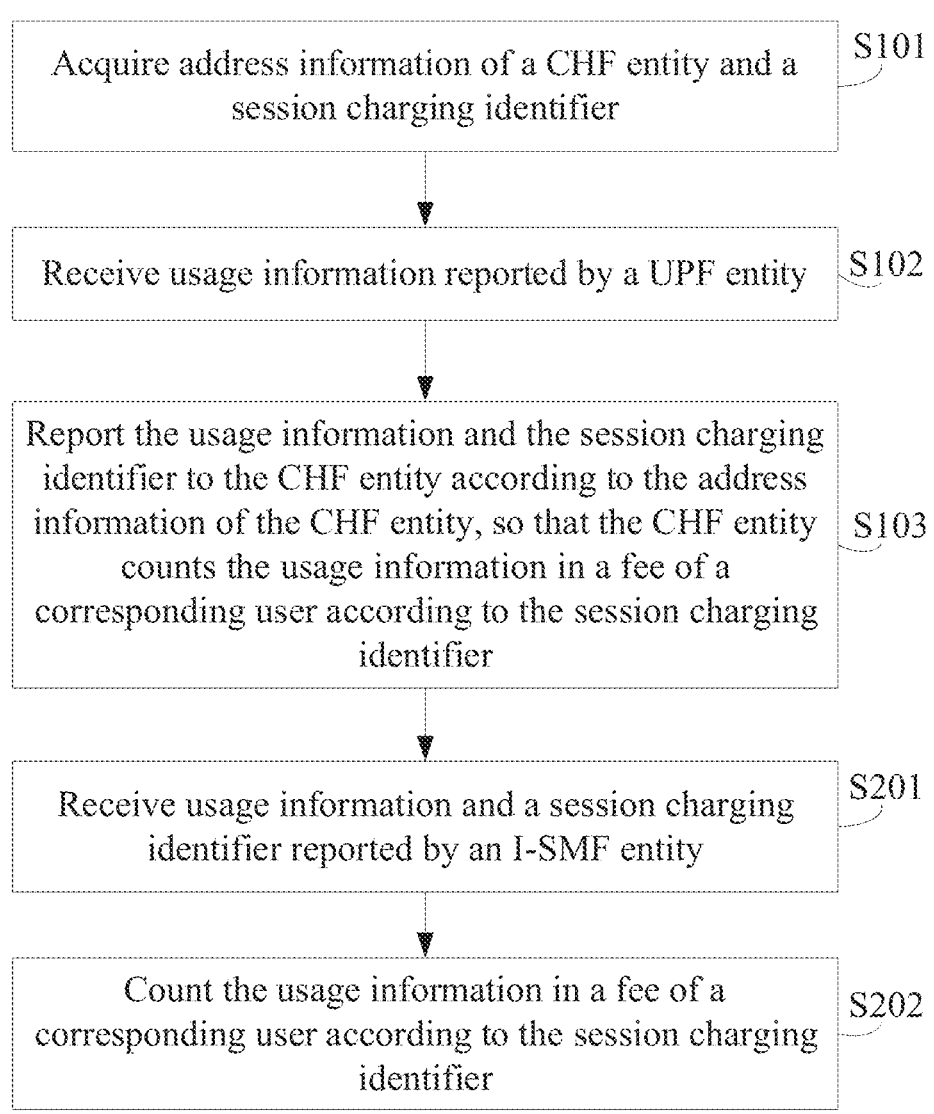
FIG. 4 is a flowchart of still another embodiment of a method for reporting usage of the present disclosure.

Refer to FIGS. 2 to 4. FIG. 2 is a flowchart of an embodiment of a method for reporting usage of the present disclosure. FIG. 3 is a flowchart of another embodiment of a method for reporting usage of the present disclosure. FIG. 4 is a flowchart of still another embodiment of a method for reporting usage of the present disclosure. It should be noted that the method of FIG. 2 is the I-SMF side method, the method of FIG. 3 is the CHF side method, and the method of FIG. 4 is a combination of the I-SMF side method and the CHF side method.

The I-SMF side method includes S101, S102, and S103. The CHF side method includes S201 and S202.

The I-SMF side method includes the following steps.

At S101, address information of a CHF entity and a session charging identifier are acquired.

At S102, usage information reported by a managed UPF entity is received.

At S103, the usage information and the session charging identifier are reported to the CHF entity according to the address information of the CHF entity, so that the CHF entity counts the usage information in a fee of a corresponding user according to the session charging identifier.

The CHF side method includes the following steps.

At S201, usage information and a session charging identifier reported by an I-SMF entity are received.

At S202, the usage information is counted in a fee of a corresponding user according to the session charging identifier.

In this embodiment, the address information of the CHF may be address information of information which is sent to the CHF and can be received by the CHF. The address information of the CHF includes, but is not limited to: an IP address, fully qualified domain name (FQDN) information, etc. Here, the FQDN information carries both a host name and a domain name. For example, if the host name is bigserver and the domain name is mycompany.com, then the FQDN is bigserver.mycompany.com. The FQDN can logically and accurately represent a location of the host in a domain name tree. Alternatively, the FQDN may be considered as a complete representation of the host name. The session charging identifier may be an identifier for charging a current established session, and a corresponding user may be found according to the session charging identifier.

Here, a manner of acquiring the address information of the CHF entity and the session charging identifier may include: acquiring the address information of the CHF entity and the session charging identifier from SMF, or if the address information of the CHF entity and the session charging identifier have been obtained in advance and stored locally in the I-SMF, acquiring the address information of the CHF entity and the session charging identifier locally or acquiring them from the CHF. The information may be acquired in an alternative manner, which is not limited herein.

In this embodiment, the usage information reported by the UPF managed by the I-SMF may be usage information reported by the UPF regularly, or usage information reported when the UPF goes offline (for example, when the UPF is deleted).

The I-SMF reports the usage information and the session charging identifier to the CHF entity according to the address information of the CHF entity. After receiving the usage information and the session charging identifier reported by the I-SMF, the CHF entity counts the usage information in the fee of a corresponding user according to the session charging identifier.

The method on the I-SMF side of an embodiment of the present disclosure includes: acquiring address information of a CHF entity and a session charging identifier; receiving usage information reported by a managed UPF entity; and reporting the usage information and the session charging identifier to the CHF entity according to the address information of the CHF entity, so that the CHF entity counts the usage information in a fee of a corresponding user according to the session charging identifier. The I-SMF reports the usage information and the session charging identifier to the CHF according to the acquired address information of the CHF. In this way, the I-SMF can report usage of a managed UPF to the CHF without forwarding of the SMF, which provides technical support for the CHF to count the usage of the UPF, and therefore provides technical support for avoiding a loss of usage and further avoiding a loss to an operator. A method on the CHF side includes: receiving usage information and a session charging identifier reported by an I-SMF entity; and counting the usage information in a fee of a corresponding user according to the session charging identifier. The CHF counts the usage information in the fee of a corresponding user according to the received session charging identifier. In this way, technical support can be provided for the CHF to count the usage of the UPF, thereby providing technical support for avoiding a loss of usage record and avoiding a loss to an operator.

In an embodiment, after S202, to send an acknowledgment to the I-SMF that the CHF has received the usage information reported by the I-SMF, the CHF side may further perform S203. At S203, response information is sent to the I-SMF.

In this case, after step S103, the I-SMF may further perform S104. At S104, response information of the CHF entity is received.

In an embodiment, to simplify a network topology as much as possible, the I-SMF reports the usage information and the session charging identifier to the CHF entity in an implementation that the I-SMF adds an N40a interface between the I-SMF and the CHF, and reports the usage information and the session charging identifier to the CHF through the N40a interface.

To be specific, the reporting the usage information and the session charging identifier to the CHF entity according to the address information of the CHF entity in S103 on the I-SMF side may include: reporting the usage information and the session charging identifier to the CHF entity according to the address information of the CHF entity through the pre-established N40a interface.

Figure 5:
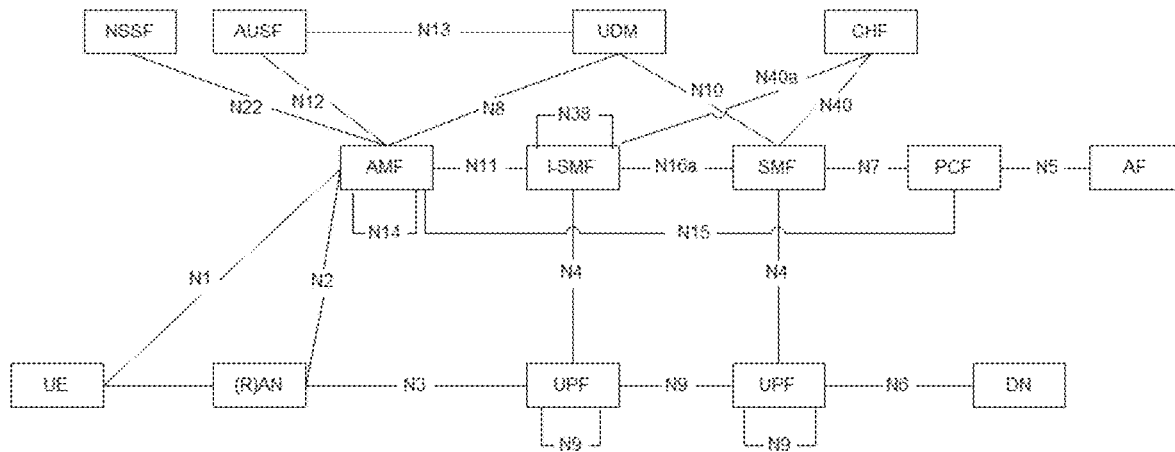
FIG. 5 is a schematic diagram of an overall architecture of an embodiment of a method for reporting usage of the present disclosure.

Referring to FIG. 5, a schematic diagram of an overall architecture of an embodiment of a method for reporting usage of the present disclosure is depicted. In the schematic diagram of the overall architecture of this embodiment, the I-SMF pre-establishes the N40a interface, through which the I-SMF directly reports the usage information of the managed UPF to the CHF.

In an embodiment, to avoid a major change to the overall architecture of 5G with I-SMF as much as possible and reduce a cost, the address information of the CHF entity and the session charging identifier are acquired from the SMF. In other words, the SMF sends the address information of the CHF entity and the session charging identifier to the I-SMF.

To be specific, the SMF side method includes: sending the address information of the CHF entity and the session charging identifier to the I-SMF entity.

In this case, the acquiring address information of a CHF entity and a session charging identifier in S101 on the I-SMF side may include: acquiring the address information of the CHF entity and the session charging identifier from the SMF entity and locally storing the address information and the session charging identifier.

Here, to ensure that the I-SMF can receive the address information of the CHF entity and the session charging identifier as much as possible, the SMF may send the address information of the CHF entity and the session charging identifier at a time when the I-SMF is in an online phase. To be specific, the sending the address information of the CHF entity and the session charging identifier to the I-SMF entity by the SMF side may further include: sending the address information of the CHF entity and the session charging identifier to the I-SMF entity in an online phase of the I-SMF entity. The acquiring the address information of the CHF entity and the session charging identifier from the SMF entity and locally storing the address information and the session charging identifier in S101 on the I-SMF side may further include: acquiring the address information of the CHF entity and the session charging identifier from the SMF entity and locally storing the address information and the session charging identifier in an online phase.

Here, to ensure that the session charging identifier corresponds to the user, the address information of the CHF entity and the session charging identifier can be sent in a session establishment process initiated by a user equipment (UE). To be specific, the sending, by the SMF side, the address information of the CHF entity and the session charging identifier to the I-SMF entity when the I-SMF entity is in an online phase may include: sending the address information of the CHF entity and the session charging identifier to the I-SMF entity in the session establishment process initiated by the UE. The acquiring the address information of the CHF entity and the session charging identifier from the SMF entity and locally storing the address information and the session charging identifier in an online phase in S101 on the I-SMF side may further include: in the session establishment process initiated by the UE, receiving the address information of the CHF entity and the session charging identifier sent from the SMF entity and locally storing the address information and the session charging identifier.

In the overall architecture of 5G with I-SMF, a usual process is as follows. When the I-SMF manages the UPF, the I-SMF needs to request corresponding N4 information and charging information from the SMF first. Then the SMF generates N4 information and charging information (the SMF needs to obtain the N4 information and charging information from another network function entity on the control plane) and transmits them to the I-SMF, and the I-SMF initiates a corresponding operation request of the UPF. When the UPF managed by the I-SMF reports usage regularly or in an offline state, the UPF reports to the SMF via the I-SMF, and finally to the CHF via the SMF.

In an embodiment, the process is supposed to be executed as usual to avoid an excessive change. In response to a normal interaction between the I-SMF and the SMF, the usual process is used. In response to an abnormal interaction between the I-SMF and the SMF, the process of reporting to the CHF via the I-SMF in this embodiment of the present disclosure is used.

To be specific, the reporting the usage information and the session charging identifier to the CHF entity according to the address information of the CHF entity in S103 in the I-SMF side method may include: in response to determining that interaction with an SMF entity is abnormal, reporting the usage information and the session charging identifier to the CHF entity according to the address information of the CHF entity.

In this embodiment, the abnormal interaction between the I-SMF and the SMF may be the case that the I-SMF fails to report, to the SMF according to the usual process, an interaction state of the usage information of the UPF managed by the I-SMF. For example, the I-SMF and SMF suffers link failure, message transmission failure, etc.

Figure 6:
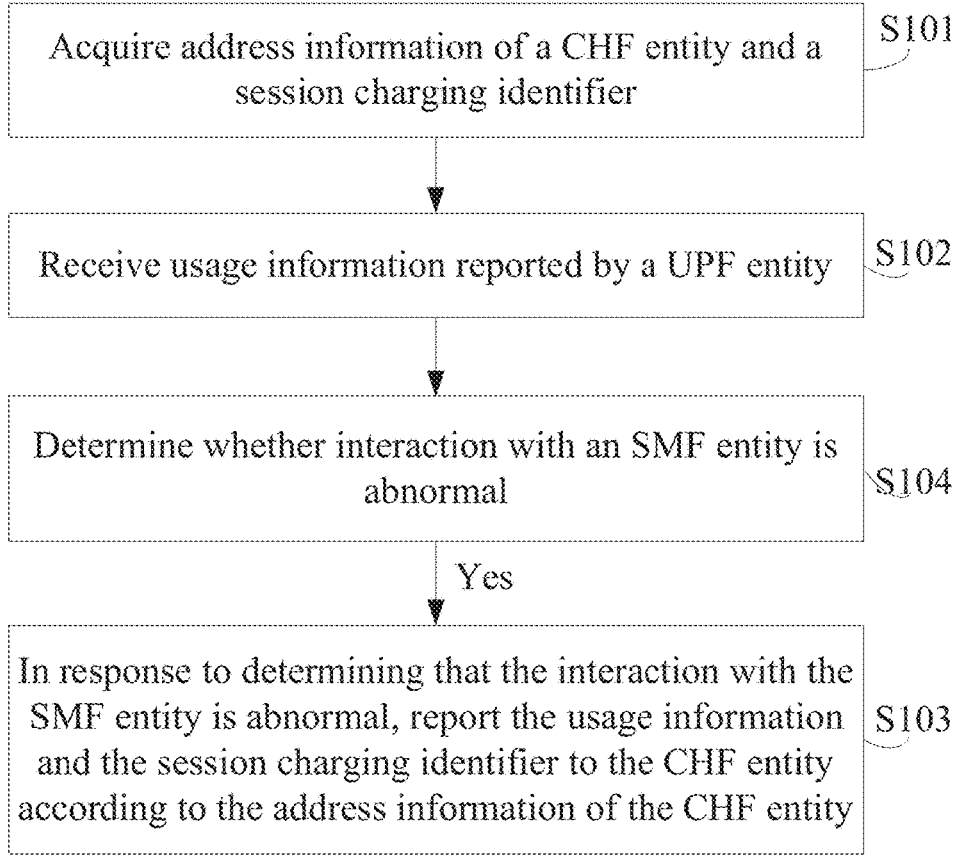
FIG. 6 is a flowchart of yet another embodiment of a method for reporting usage of the present disclosure.

In this case, before in response to determining that interaction with an SMF entity is abnormal, reporting the usage information and the session charging identifier to the CHF entity according to the address information of the CHF entity, S103 in the I-SMF side method further includes S104. Refer to FIG. 6.

At S104, it is determined whether the interaction with the SMF entity is abnormal.

At S104, the determination of whether the interaction with the SMF entity is abnormal may include a plurality of cases, among which the common ones are as follows:

In the first case, the usage information and the session charging identifier are reported to the SMF entity; and in response to failed transmission of the usage information and the session charging identifier, it is determined that the interaction with the SMF entity is abnormal. To be specific, although the I-SMF sends the usage information and the session charging identifier to the SMF, the message fails to be sent, and the I-SMF fails to report, to the SMF according to the usual process, the usage information of the UPF managed by the I-SMF. In this case, it can be determined that the interaction between the I-SMF and the SMF entity is abnormal.

In the second case, the usage information and the session charging identifier are reported to the SMF entity; and in response to successful transmission of the usage information and the session charging identifier but no response information from the SMF being received within a preset time period, it is determined that the interaction with the SMF entity is abnormal. To be specific, the I-SMF sends the usage information and the session charging identifier to the SMF, and the message is sent successfully, in which case the I-SMF side sets a timer to wait for a response message from the SMF side, but the response from the SMF that the I-SMF has been waiting times out. The I-SMF fails to report, to the SMF according to the usual process, the usage information of the UPF managed by the I-SMF. In this case, it can be determined that the interaction between the I-SMF and the SMF entity is abnormal.

In the third case, the usage information and the session charging identifier are reported to the SMF entity; and in response to successful transmission of the usage information and the session charging identifier but response failure information from the SMF being received, it is determined that the interaction with the SMF entity is abnormal. To be specific, the I-SMF sends the usage information and the session charging identifier to the SMF, and the message is sent successfully, but the SMF side returns response failure information. In other words, the SMF side does not give a normal response to the usage information and the session charging identifier reported by the I-SMF side. The I-SMF fails to report, to the SMF according to the usual process, the usage information of the UPF managed by the I-SMF. In this case, it can be determined that the interaction between the I-SMF and the SMF entity is abnormal.

In the fourth case, in response to a fault of a link between the I-SMF and the SMF being detected, it is determined that the interaction with the SMF entity is abnormal. The I-SMF side detects the link between the I-SMF and the SMF (for example, a time interval may be set for regular detection). When a fault of the link between the I-SMF and the SMF is detected, the I-SMF fails to report, to the SMF according to the usual process, the usage information of the UPF managed by the I-SMF. In this case, it can be determined that the interaction between the I-SMF and the SMF entity is abnormal.

Processes of the method of the embodiments of the present disclosure in the four cases of abnormal interaction between the I-SMF and the SMF will be explained in detail with specific embodiments below.

Figure 7:
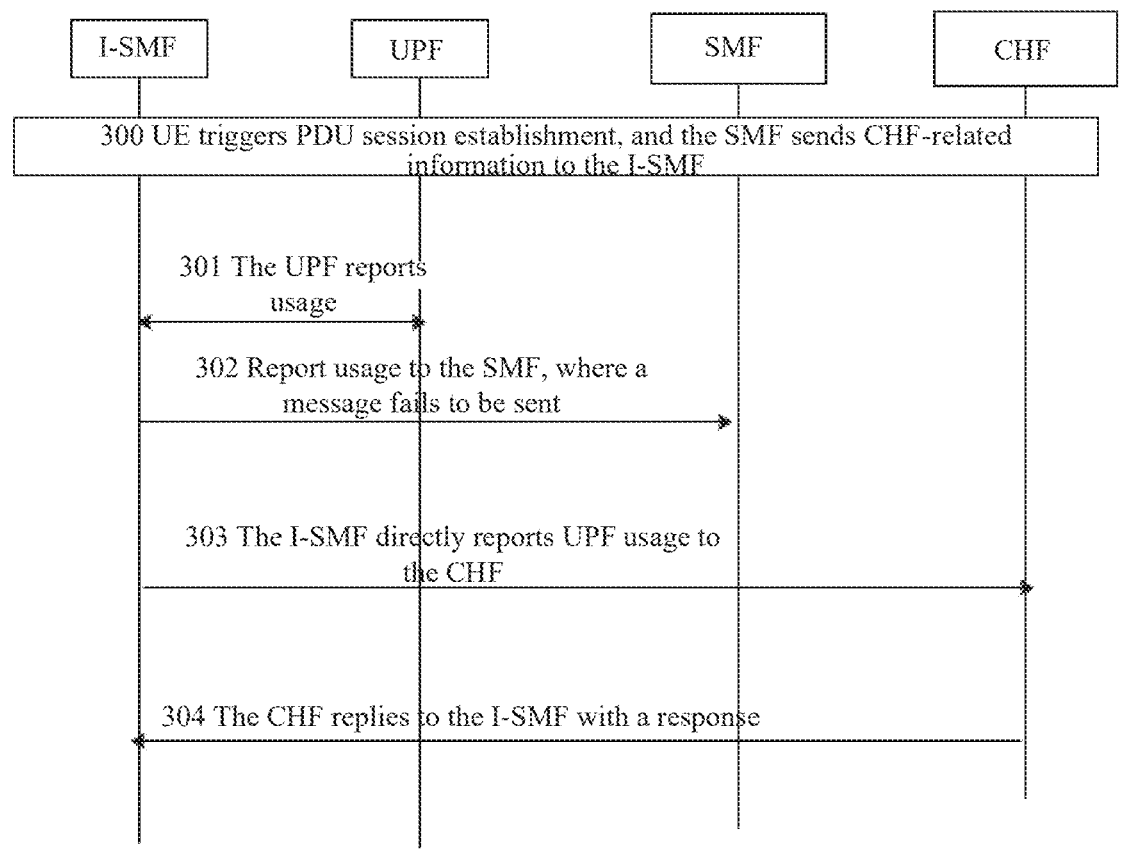
FIG. 7 is a flowchart of an embodiment of a method for reporting usage in a scenario in which a message is sent unsuccessfully of the present disclosure.

Referring to FIG. 7, a flowchart of an embodiment of a method for reporting usage in a scenario in which a message is sent unsuccessfully of the present disclosure is depicted.

In this embodiment, in a process in which an I-SMF reports usage information to an SMF, for reporting of the usage information in the scenario in which the message is sent unsuccessfully, the embodiment includes the following steps.

At 300, a UE initiates a PDU session establishment request, and the I-SMF establishes a UPF after the PDU session is established. The SMF delivers an address of a CHF or FQDN information (namely, address information of the CHF) and a session charging identifier (indicated as CHF-related information in the figure) to the I-SMF in a session establishment process, and the I-SMF stores them locally.

At 301, the UPF managed by the I-SMF reports the usage information to the I-SMF as the UPF is deleted or usage reporting is required.

At 302, the I-SMF receives the usage information reported by the UPF, and reports the usage information to the SMF through an update request or a response message, but the message fails to be sent.

At 303, the I-SMF reports the usage information to the CHF through the address information of the CHF and the session charging identifier sent from the SMF previously.

At 304, the CHF receives the usage information of the I-SMF, counts the usage information into a fee of a same user according to the session charging identifier, and replies to the I-SMF with a response message. This ensures accurate charging and no loss of the usage information.

Figure 8:
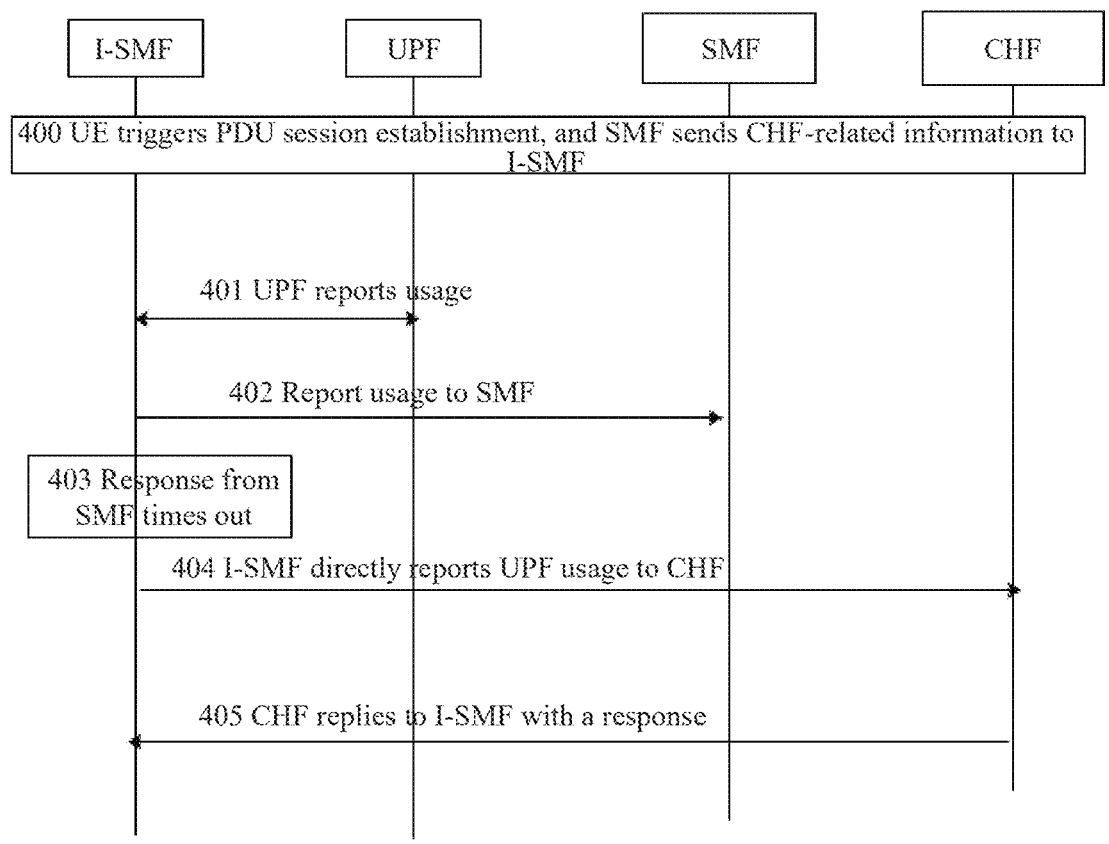
FIG. 8 is a flowchart of an embodiment of a method for reporting usage in a scenario in which a message is sent successfully and a response from an SMF times out of the present disclosure.

Referring to FIG. 8, a flowchart of an embodiment of a method for reporting usage in a scenario in which a message is sent successfully and a response from an SMF times out of the present disclosure is depicted.

In this embodiment, in a process in which an I-SMF reports usage information to an SMF, for reporting of the usage information in a scenario in which the message is sent successfully but a response from the SMF times out, the embodiment includes the following steps:

At 400, a UE initiates a PDU session establishment request, and the I-SMF establishes a UPF after the PDU session is established. The SMF delivers an address of a CHF or FQDN information (namely, address information of the CHF) and a session charging identifier (indicated as CHF-related information in the figure) to the I-SMF in a session establishment process, and the I-SMF stores them locally.

At 401, the UPF managed by the I-SMF reports the usage information to the I-SMF as the UPF is deleted or usage reporting is required.

At 402, the I-SMF receives the usage information reported by the UPF, and reports the usage information to the SMF through an update request or a response message. The message is sent successfully, in which case the I-SMF set a timer to wait for a response message of the SMF.

At 403, a response from the SMF that the I-SMF has been waiting times out.

At 404, the I-SMF reports the usage information to the CHF through the address information of the CHF and the session charging identifier sent from the SMF previously.

At 405, the CHF receives the usage information of the I-SMF, counts the usage information into a fee of a same user according to the session charging identifier, and replies to the I-SMF with a response message. This ensures accurate charging and no loss of the usage information.

Figure 9:
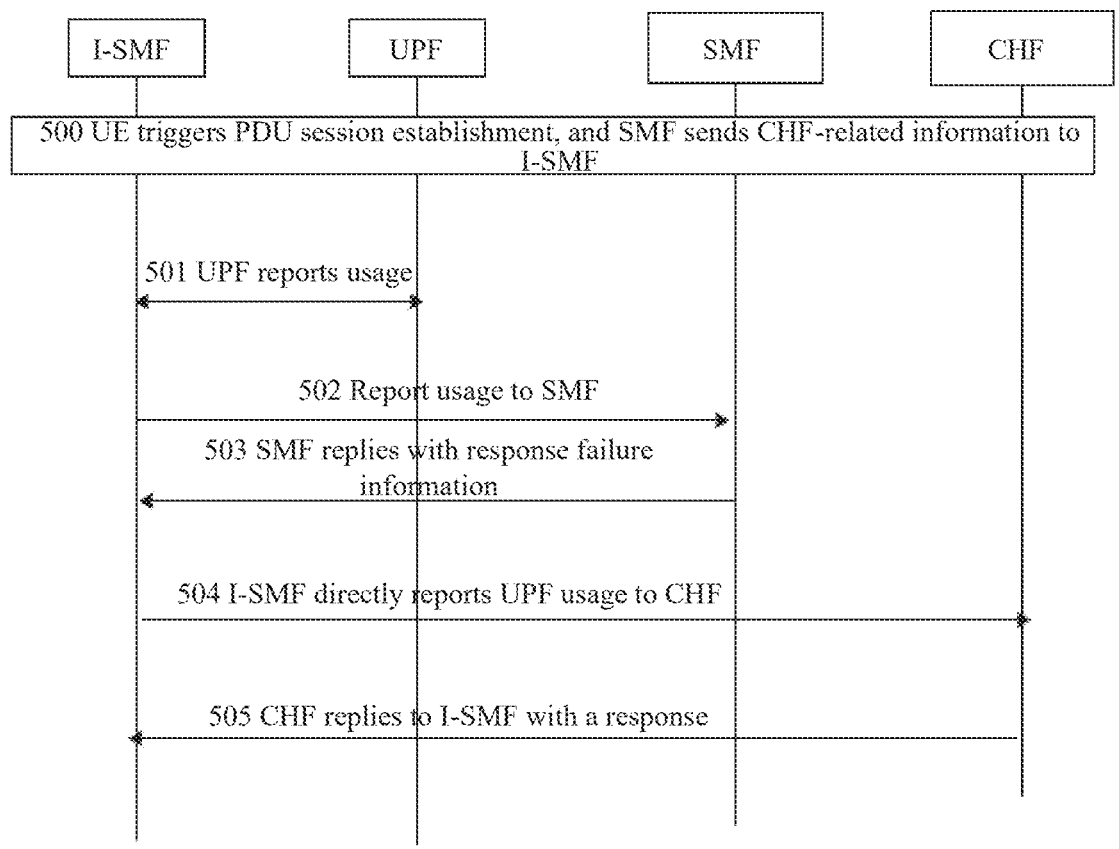
FIG. 9 is a flowchart of an embodiment of a method for reporting usage in a scenario in which a message is sent successfully but an SMF replies with a response failure message of the present disclosure.

Referring to FIG. 9, a flowchart of an embodiment of a method for reporting usage in a scenario in which a message is sent successfully but an SMF replies with a response failure message of the present disclosure is depicted.

In this embodiment, in a process in which an I-SMF reports usage information to an SMF, for reporting of the usage information in a scenario in which the message is sent successfully but the SMF replies with a response failure message, the embodiment includes the following steps.

At 500, a UE initiates a PDU session establishment request, and the I-SMF establishes a UPF after the PDU session is established. The SMF delivers an address of a CHF or FQDN information (namely, address information of the CHF) and a session charging identifier (indicated as CHF-related information in the figure) to the I-SMF in a session establishment process, and the I-SMF stores them locally.

At 501, the UPF managed by the I-SMF reports the usage information to the I-SMF as the UPF is deleted or usage reporting is required.

At 502, the I-SMF receives the usage information reported by the UPF, and reports the usage information to the SMF through an update request or a response message. The message is sent successfully, in which case the I-SMF set a timer to wait for a response message.

At 503, the SMF replies to the I-SMF with response failure information.

At 504, the I-SMF reports the usage information to the CHF through the address information of the CHF and the session charging identifier sent from the SMF previously.

At 505, the CHF receives the usage information of the I-SMF, counts the usage information into a fee of a same user according to the session charging identifier, and replies to the I-SMF with a response message. This ensures accurate charging and no loss of the usage information.

Figure 10:
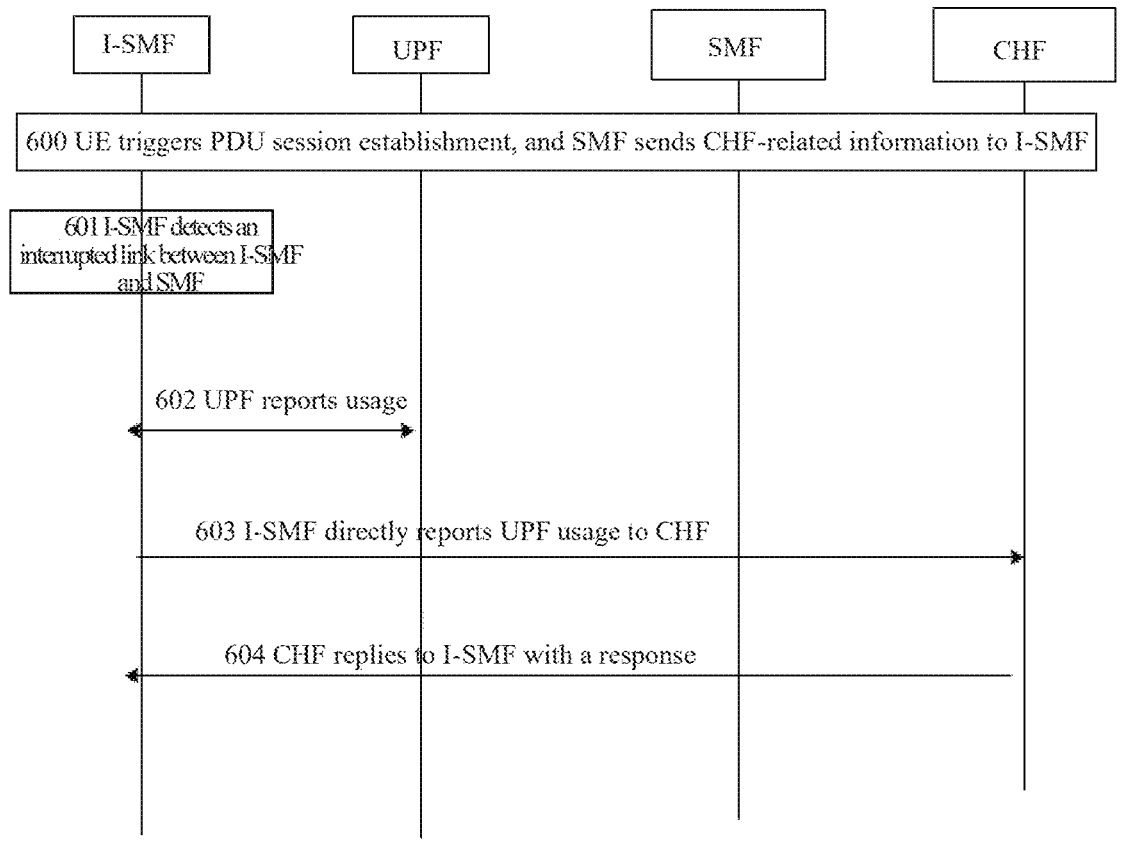
FIG. 10 is a flowchart of an embodiment of a method for reporting usage in a scenario in which an I-SMF detects a fault of a link between the I-SMF and an SMF of the present disclosure.

Referring to FIG. 10, a flowchart of an embodiment of a method for reporting usage in a scenario in which an I-SMF detects a fault of a link between the I-SMF and an SMF of the present disclosure.

For reporting of usage information in the scenario in which the I-SMF detects a fault of the link between the I-SMF and the SMF, the embodiment includes the following steps:

At 600, a UE initiates a PDU session establishment request, and the I-SMF establishes a UPF after the PDU session is established. The SMF delivers an address of a CHF or FQDN information (namely, address information of the CHF) and a session charging identifier (indicated as CHF-related information in the figure) to the I-SMF in a session establishment process, and the I-SMF stores them locally.

At 601, the I-SMF detects a fault of a link between the I-SMF and the SMF.

At 602, the UPF managed by the I-SMF reports the usage information to the I-SMF as the UPF is deleted or usage reporting is required.

At 603, the I-SMF reports the usage information to the CHF through the address information of the CHF and the session charging identifier sent from the SMF previously.

At 604, the CHF receives the usage information of the I-SMF, counts the usage information into a fee of a same user according to the session charging identifier, and replies to the I-SMF with a response message. This ensures accurate charging and no loss of the usage information.

Figure 11:
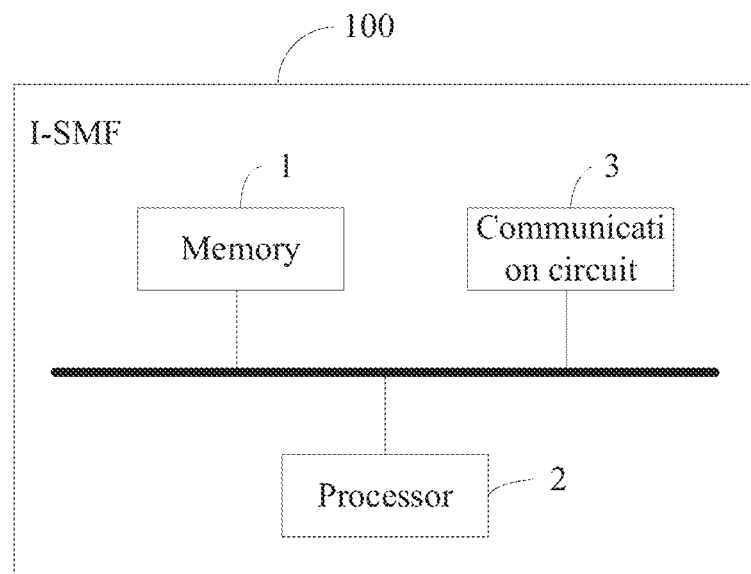
FIG. 11 is a schematic diagram of an embodiment of an I-SMF entity of the present disclosure.

Referring to FIG. 11, a schematic diagram of an embodiment of an I-SMF entity of the present disclosure is depicted. It should be noted that the I-SMF of this embodiment can realize the method for reporting usage which is applied to the I-SMF entity. For detailed descriptions of relevant content, refer to the method described above, and details are not repeated herein.

The I-SMF 100 includes a communication circuit 3, a memory 1, and a processor 2, where the communication circuit 3 is configured for communication; the memory 1 is configured to store a computer program; and the processor 2 is configured to execute the computer program and, when executing the computer program, implement any one of the foregoing methods for reporting usage applied to the I-SMF.

Here, the processor 2 may be a micro control unit, a central processing unit, a digital signal processor, etc. The memory 1 may be a Flash chip, a read-only memory, a magnetic disk, an optical disc, a USB flash drive, a removable hard disk, etc.

Figure 12:
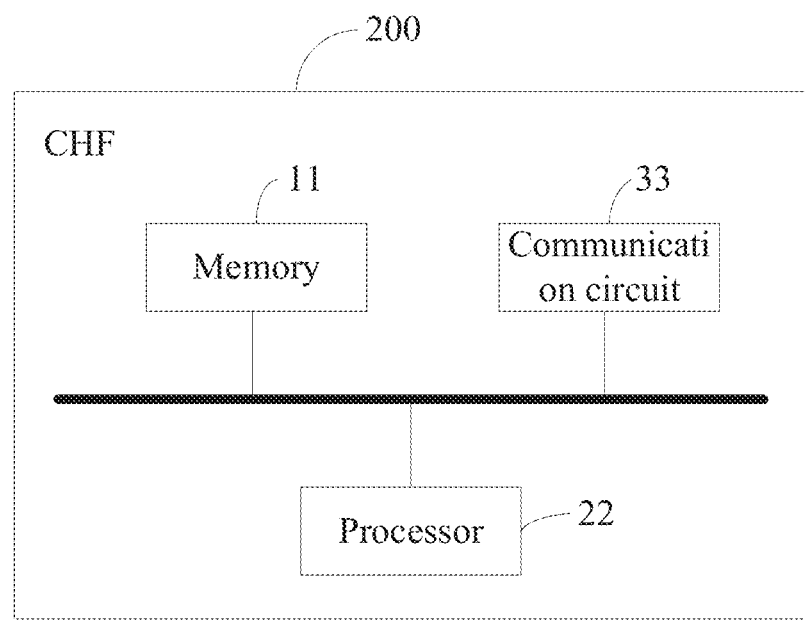
FIG. 12 is a schematic diagram of an embodiment of a CHF entity of the present disclosure.

Referring to FIG. 12, a schematic diagram of an embodiment of a CHF entity of the present disclosure is depicted. It should be noted that the CHF of this embodiment can realize the method for reporting usage which is applied to the CHF entity. For detailed descriptions of relevant content, refer to the method described above, and details are not repeated herein.

The CHF 200 includes a communication circuit 33, a memory 11, and a processor 22, where the communication circuit 33 is configured for communication; the memory 11 is configured to store a computer program; and the processor 22 is configured to execute the computer program and, when executing the computer program, implement any one of the foregoing methods for reporting usage applied to the CHF.

Here, the processor 22 may be a micro control unit, a central processing unit, a digital signal processor, etc. The memory 11 may be a Flash chip, a read-only memory, a magnetic disk, an optical disc, a USB flash drive, a removable hard disk, etc.

Figure 13:
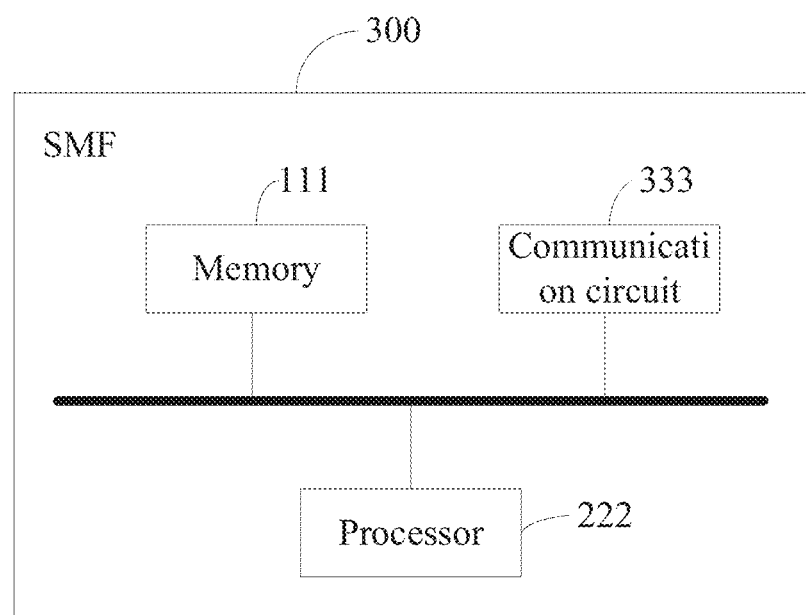
FIG. 13 is a schematic diagram of an embodiment of an SMF entity of the present disclosure.

Referring to FIG. 13, a schematic diagram of an embodiment of an SMF entity of the present disclosure is depicted. It should be noted that the SMF of this embodiment can realize the method for reporting usage which is applied to the SMF. For detailed descriptions of relevant content, refer to the method described above, and details are not repeated herein.

The SMF 300 includes a communication circuit 333, a memory 111, and a processor 222, where the communication circuit 333 is configured for communication; the memory 111 is configured to store a computer program; and the processor 222 is configured to execute the computer program and, when executing the computer program, implement any one of the foregoing methods for reporting usage applied to the SMF.

Here, the processor 222 may be a micro control unit, a central processing unit, a digital signal processor, etc. The memory 111 may be a Flash chip, a read-only memory, a magnetic disk, an optical disc, a USB flash drive, a removable hard disk, etc.

A further embodiment of the present disclosure provides a non-transitory computer-readable storage medium storing a computer program which, when executed by a processor, causes the processor to implement any one of the foregoing methods for reporting usage applied to the I-SMF.

Here, the computer-readable storage medium may be an internal storage unit of the I-SMF, such as a hard disk or an internal storage. The computer-readable storage medium may alternatively be an external storage device of the I-SMF, such as an equipped plug-in hard disk, a smart media card (SMC), a secure digital card, a flash card, etc.

A further embodiment of the present disclosure provides a non-transitory computer-readable storage medium storing a computer program which, when executed by a processor, causes the processor to implement any one of the foregoing methods for reporting usage applied to the CHF.

Here, the computer-readable storage medium may be an internal storage unit of the CHF, such as a hard disk or an internal storage. The computer-readable storage medium may alternatively be an external storage device of the CHF, such as an equipped plug-in hard disk, a smart media card (SMC), a secure digital card, a flash card, etc.

A further embodiment of the present disclosure provides a non-transitory computer-readable storage medium storing a computer program which, when executed by a processor, causes the processor to implement any one of the foregoing methods for reporting usage applied to the SMF.

Here, the computer-readable storage medium may be an internal storage unit of the SMF, such as a hard disk or an internal storage. The computer-readable storage medium may alternatively be an external storage device of the SMF, such as an equipped plug-in hard disk, a smart media card (SMC), a secure digital card, a flash card, etc.

A further embodiment of the present disclosure provides a method for reporting usage, an I-SMF entity, a CHF entity, an SMF entity, and a non-transitory storage medium, to report usage of a UPF managed by the I-SMF to the CHF without forwarding of the SMF, so that the CHF can count the usage of the UPF, thereby avoiding a loss of usage record and a loss to the operator.

A further embodiment of the present disclosure provides a method for reporting usage, an I-SMF entity, a CHF entity, an SMF entity, and a non-transitory storage medium. The method on the I-SMF side includes: acquiring address information of a CHF entity and a session charging identifier; receiving usage information reported by a managed UPF entity; and reporting the usage information and the session charging identifier to the CHF entity according to the address information of the CHF entity, so that the CHF entity counts the usage information in a fee of a corresponding user according to the session charging identifier. The I-SMF reports the usage information and the session charging identifier to the CHF according to the acquired address information of the CHF. In this way, the I-SMF can report usage of a managed UPF to the CHF without forwarding of the SMF, which provides technical support for the CHF to count the usage of the UPF, and therefore provides technical support for avoiding a loss of usage and further avoiding a loss to an operator. A method on the CHF side includes: receiving usage information and a session charging identifier reported by an I-SMF entity; and counting the usage information in a fee of a corresponding user according to the session charging identifier. The CHF counts the usage information in the fee of a corresponding user according to the received session charging identifier. In this way, technical support can be provided for the CHF to count the usage of the UPF, thereby providing technical support for avoiding a loss of usage record and avoiding a loss to an operator. A method on the SMF side includes: sending address information of a CHF entity and a session charging identifier to an I-SMF entity. In this way, the I-SMF can conveniently obtain the address information of the CHF and the session charging identifier according to the current 5G system, providing technical support for the I-SMF to report the usage to the CHF.

It can be understood by those of ordinary skill in the art that all or some of the steps of the methods, systems and functional modules/units in the devices disclosed above can be implemented as software, firmware, hardware and appropriate combinations thereof.

In a hardware embodiment, the division between functional modules/units mentioned in the above description does not necessarily correspond to the division of physical components; for example, a physical component may have multiple functions, or a function or step may be performed cooperatively by several physical components. Some or all of the physical components may be implemented as software executed by a processor, such as a central processing unit, a digital signal processor or a microprocessor, or as hardware, or as an integrated circuit, such as an application-specific integrated circuit. Such software can be distributed on computer-readable media, which can include computer-readable storage media (or non-transitory media) and communication media (or transitory media). As well known to those of ordinary skill in the art, the term computer-readable storage medium includes volatile and nonvolatile, removable and non-removable media implemented in any method or technique for storing information, such as computer-readable instructions, data structures, program modules or other data. A computer storage medium includes but is not limited to RAM, ROM, EEPROM, flash memory or other memory technologies, CD-ROM, digital versatile disk (DVD) or other optical disk storage, cassettes, magnetic tapes, magnetic disk storage or other magnetic storage devices, or any other medium that can be configured to store desired information and can be accessed by a computer. Furthermore, it is well known to those of ordinary skill in the art that communication media typically contain computer-readable instructions, data structures, program modules or other data in a modulated data signal such as a carrier wave or other transmission mechanism, and can include any information transmission media.

Some embodiments of the present disclosure have been described above with reference to the accompanying drawings and are not to limit the scope of the present disclosure. Any modifications, equivalent substitutions, and improvements made by those having ordinary skill in the art without departing from the scope and essence of the present disclosure shall fall within the scope of the present disclosure.

What is claimed is:

1. A method for reporting usage, applied to an Intermediate-Session Management Function (I-SMF) entity, the method comprising:
   acquiring address information of a CHarging Function (CHF) entity and a session charging identifier;
   receiving usage information reported by a managed User Plane Function (UPF) entity; and
   in response to determining that interaction with an SMF entity is abnormal, reporting the usage information and the session charging identifier to the CHF entity according to the address information of the CHF entity, so that the CHF entity counts the usage information in a fee of a corresponding user according to the session charging identifier.

2. The method of claim 1, wherein the acquiring address information of a CHF entity and a session charging identifier comprises:
   acquiring the address information of the CHF entity and the session charging identifier from a Session Management Function (SMF) entity and locally storing the address information and the session charging identifier.

3. The method of claim 2, wherein the acquiring the address information of the CHF entity and the session charging identifier from an SMF entity and locally storing the address information and the session charging identifier comprises:
   acquiring the address information of the CHF entity and the session charging identifier from the SMF entity and locally storing the address information and the session charging identifier in an online phase.

4. The method of claim 3, wherein the acquiring the address information of the CHF entity and the session charging identifier from the SMF entity and locally storing the address information and the session charging identifier in an online phase comprises:
   in a session establishment process initiated by a user equipment (UE), receiving the address information of the CHF entity and the session charging identifier sent from the SMF entity and locally storing the address information and the session charging identifier.

5. The method of claim 1, after reporting the usage information and the session charging identifier to the CHF entity according to the address information of the CHF entity, further comprising:
   receiving response information of the CHF entity.

6. The method of claim 1, wherein the reporting the usage information and the session charging identifier to the CHF entity according to the address information of the CHF entity comprises:
   reporting the usage information and the session charging identifier to the CHF entity according to the address information of the CHF entity through a pre-established N40a interface.

7. The method of claim 1, before in response to determining that interaction with an SMF entity is abnormal, reporting the usage information and the session charging identifier to the CHF entity according to the address information of the CHF entity, further comprising:
   determining whether the interaction with the SMF entity is abnormal.

8. The method of claim 7, wherein the determining whether the interaction with the SMF entity is abnormal comprises:
   reporting the usage information and the session charging identifier to the SMF;
   in response to failed transmission of the usage information and the session charging identifier, determining that the interaction with the SMF entity is abnormal;
   or
   reporting the usage information and the session charging identifier to the SMF;

in response to successful transmission of the usage information and the session charging identifier but no response information from the SMF being received within a preset time period, determining that the interaction with the SMF entity is abnormal;

or reporting the usage information and the session charging identifier to the SMF;

in response to successful transmission of the usage information and the session charging identifier but response failure information from the SMF being received, determining that the interaction with the SMF entity is abnormal;

or in response to a fault of a link to the SMF being detected, determining that the interaction with the SMF entity is abnormal.

9. An intermediate session management function (I-SMF) entity comprising a communication circuit, a memory, and a processor, wherein the communication circuit is configured for communication; the memory is configured to store a computer program; and the processor is configured to execute the computer program and, when executing the computer program, implement the method for reporting usage of claim 1.

10. A non-transitory computer-readable storage medium storing a computer program, wherein the computer program, when executed by a processor, causes the processor to implement the method for reporting usage of claim 1.

11. A method for reporting usage, applied to a CHarging Function (CHF) entity, the method comprising:

receiving usage information and a session charging identifier reported by an Intermediate-Session Management Function (I-SMF) entity, wherein the usage information and the session charging identifier are reported by the I-SMF to the CHF entity according to address information of the CHF entity in response to the I-SMF determining that interaction with an SMF entity is abnormal; and counting the usage information in a fee of a corresponding user according to the session charging identifier.

12. The method of claim 11, after counting the usage information in a fee of a corresponding user according to the session charging identifier, further comprising:

sending response information to the I-SMF.

13. A charging function (CHF) entity comprising a communication circuit, a memory, and a processor, wherein the communication circuit is configured for communication; the memory is configured to store a computer program; and the processor is configured to execute the computer program and, when executing the computer program, implement the method for reporting usage of claim 11.

14. A non-transitory computer-readable storage medium storing a computer program, wherein the computer program, when executed by a processor, causes the processor to implement the method for reporting usage of claim 11.

15. A method for reporting usage, applied to a session management function (SMF) entity and comprising:

sending address information of a CHarging Function (CHF) entity and a session charging identifier to an Intermediate-Session Management Function (I-SMF) entity, wherein usage information and the session charging identifier are reported by the I-SMF to the CHF entity according to the address information of the CHF entity in response to the I-SMF determining that interaction with the SMF entity is abnormal.

16. The method of claim 15, wherein the sending address information of a CHF entity and a session charging identifier to an I-SMF entity comprises:

sending the address information of the CHF entity and the session charging identifier to the I-SMF entity when the I-SMF entity is in an online phase.

17. The method of claim 16, wherein the sending the address information of the CHF entity and the session charging identifier to the I-SMF entity when the I-SMF entity is in an online phase comprises:

sending the address information of the CHF entity and the session charging identifier to the I-SMF entity in a session establishment process initiated by a User Equipment (UE).

18. A session management function entity comprising a communication circuit, a memory, and a processor, wherein the communication circuit is configured for communication; the memory is configured to store a computer program; and the processor is configured to execute the computer program and, when executing the computer program, implement the method for reporting usage of claim 15.

19. A non-transitory computer-readable storage medium storing a computer program, wherein the computer program, when executed by a processor, causes the processor to implement the method for reporting usage of claim 15.

* * * * *